Aug. 11, 1931.  J. M. TAYLOR ET AL  1,818,656

PLANTER ATTACHMENT

Filed May 21, 1930  3 Sheets-Sheet 2

Inventor

Julian M. Taylor
Robert H. Taylor,

By Clarence A. O'Brien
Attorney

Aug. 11, 1931.   J. M. TAYLOR ET AL   1,818,656
PLANTER ATTACHMENT
Filed May 21, 1930   3 Sheets-Sheet 3

Inventor
Julian M. Taylor
Robert H. Taylor,
By Clarence A. O'Brien
Attorney

Patented Aug. 11, 1931

1,818,656

UNITED STATES PATENT OFFICE

JULIAN M. TAYLOR AND ROBERT H. TAYLOR, OF LAS CRUCES, NEW MEXICO

PLANTER ATTACHMENT

Application filed May 21, 1930. Serial No. 454,345.

This invention relates to agricultural implements or machines generally and more particularly to an attachment for a two row cotton or corn planter and has for its primary object to provide, in a manner as hereinafter set forth, a device of this character which is adapted to be expeditiously mounted on the frame of the planter for the purpose of forming a ridge or hill of dirt over the rows which have been planted.

Another important feature of the invention resides in the provision of pairs of coacting disks mounted on a supporting structure in such a manner that the angularity of said disks may be regulated as desired.

Another important feature of the invention resides in the provision of a novel construction and arrangement of parts whereby the disk may be elevated vertically in a manner to adjust same relative to the ground or to disengage same from the ground entirely when it is so desired.

A still further important feature of the invention resides in the provision of a yieldable means associated with the supporting structure for the disk in such a manner as to prevent injury to said disk should same come into a contact with obstructions, such as large rocks or roots which may be in the path of travel of the machine.

Other objects of the invention are to provide, in a maner as hereinafter set forth, a planter attachment of the character described which will be comparatively simple in construction, strong, durable, efficient in its use and which may be manufactured at low cost.

All of the foregoing and still further objects and advantages of the invention may become apparent from a study of the following specification, taken in connection with the accompanying drawings, wherein like characters of reference designate corresponding parts throughout the several views, and wherein:—

Figure 1:
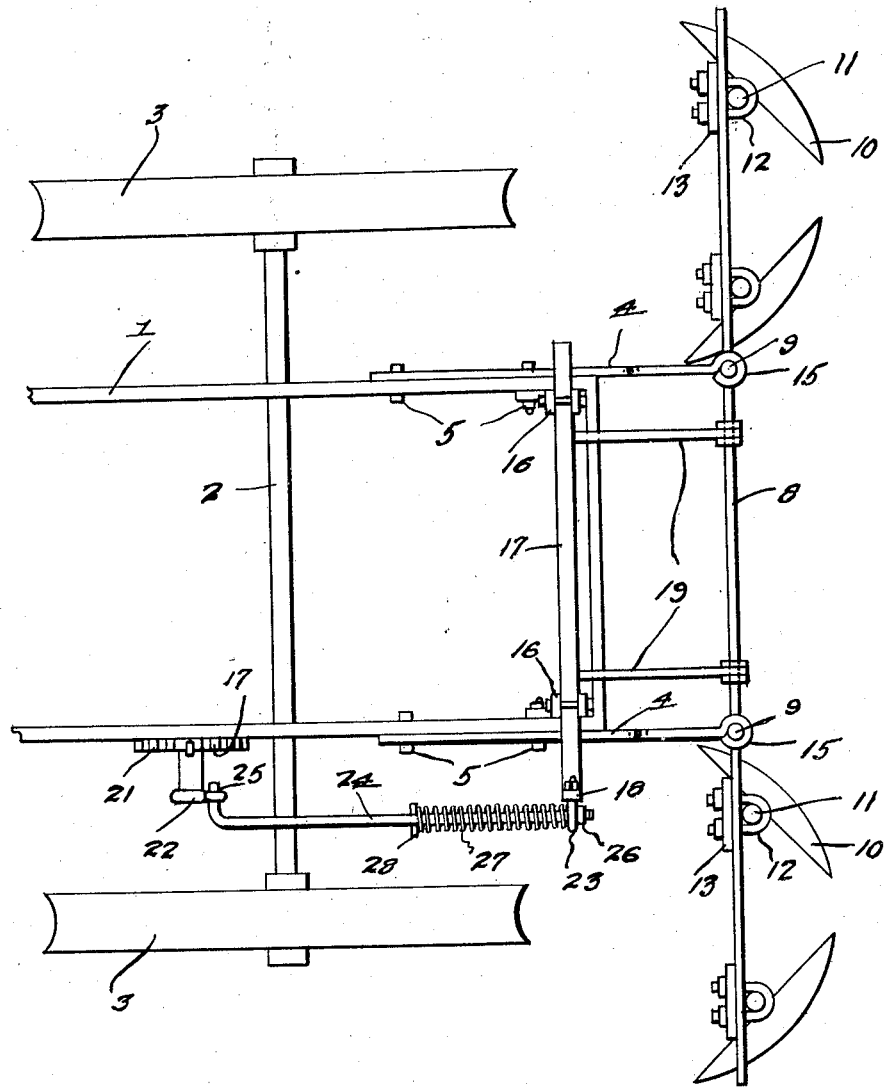
Fig. 1 is a top plan view of an attachment constructed in accordance with this invention mounted in operative position of the rear of a planter frame.
Figure 2:
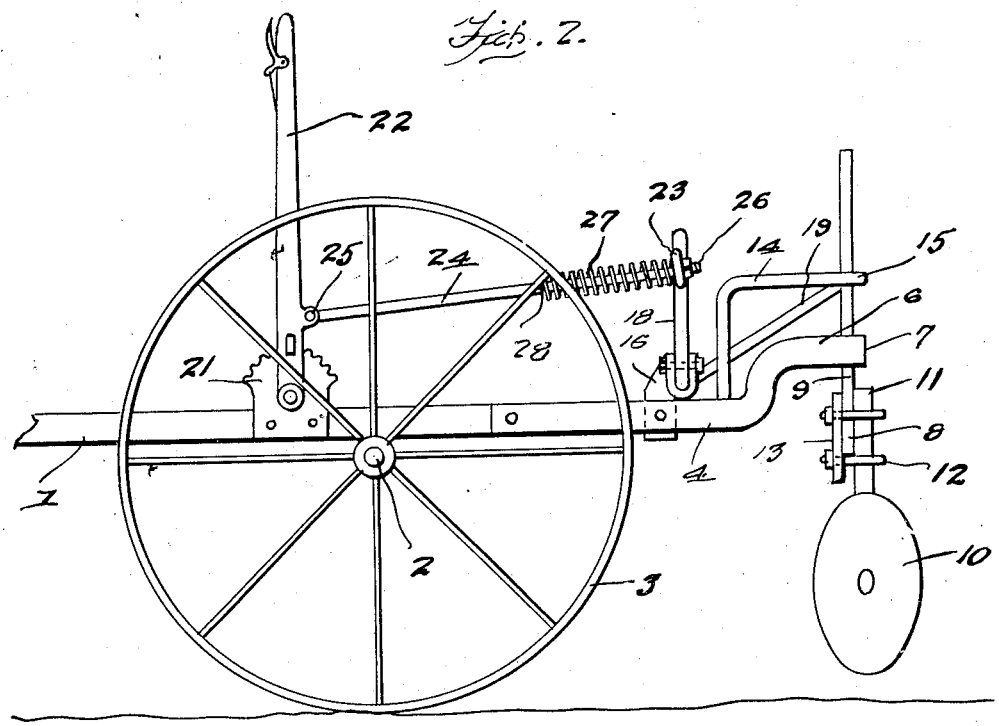
Fig. 2 is a view in side elevation thereof.
Figure 5:
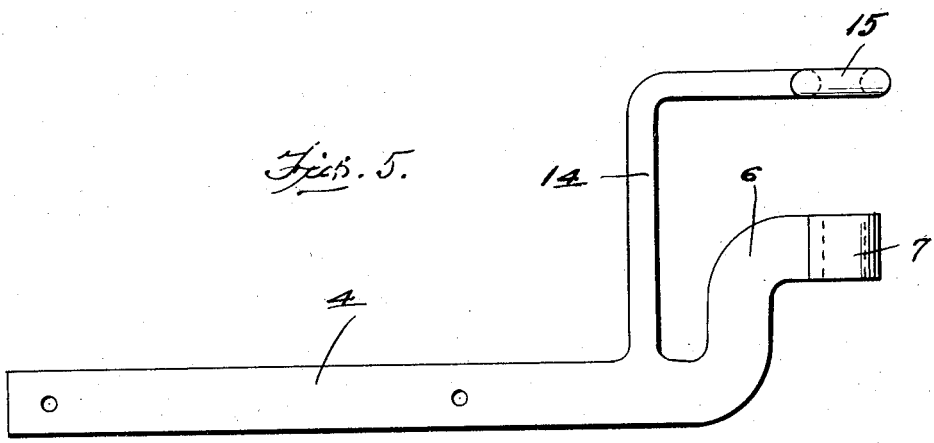
Fig. 5 is a detail view in side elevation on an enlarged scale showing one of the supporting bars.

Referring to the drawings in detail, it will be seen that the reference numeral 1 designates the planter frame having the transversely extending axle 2 upon the opposite end portion of which are rotatable the supporting wheels 3.

Bars 4 are secured to the opposite longitudinal side of the frame 1 through the medium of the bolts 5, said bars projecting rearwardly from said frame 1 and having upwardly offset free end portions 6 which terminate in the integral eyes 7.

Figure 3:
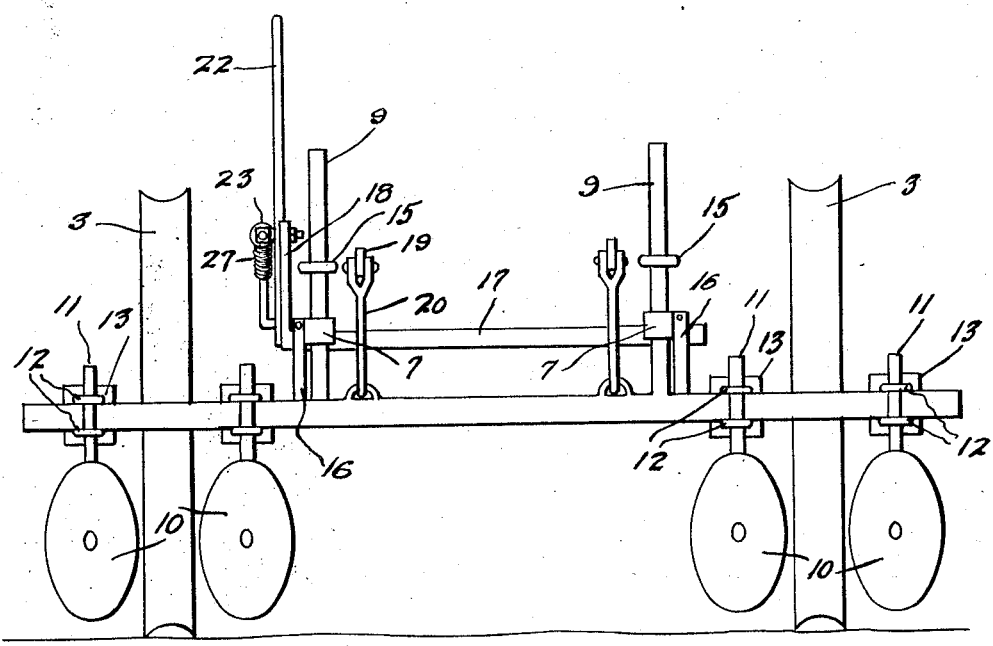
Fig. 3 is a view in rear elevation of the invention.
Figure 4:
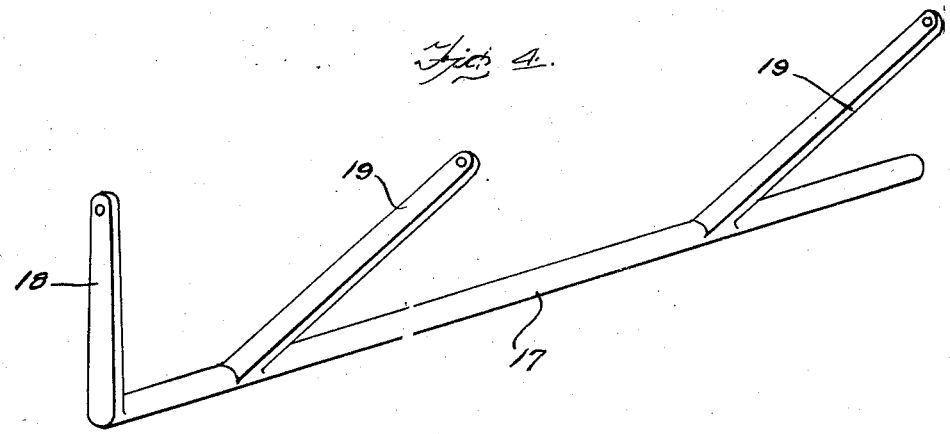
Fig. 4 is a detail view in perspective of the rockable shaft with the arms projecting therefrom for supporting the disks.

A horizontally disposed transversely extending beam 8 has formed thereon the upstanding side guide lugs 9 which extends slidably through the eyes 7. Adjustably mounted on the opposite end portions of the beam 8 are the pairs of disks 10 which are mounted on the lower end portions of the standards 11 which are adjustably secured on the beam 8 through the medium of the U-bolt 12 and the plates 13, a pair of said U-bolts 12 being disposed on each of the standards 11, one of the U-bolts of each pair being disposed above the beam 8 and the other U-bolt of each pair being disposed below the beam 8 in the manner illustrated to advantage in Fig. 3 of the drawings.

Substantially inverted L-shaped brackets 14 are mounted on the bars 4 and have the eyes 15 on their free ends disposed in vertical alinement with the eyes 7 and through which the lugs 9 slidably extend.

Rigidly mounted on the rear portion of the planter frame 1 is a pair of upstanding bearing blocks 16 which rotatably support transversely extending rockable shaft 17 having the upstanding arm 18 on one end thereof. The shaft 17 is further provided with rearwardly and outwardly extending arms 19 from the ends of which is suspended the beam 8 through the medium of the pivotally connected links 20.

A toothed segment 21 is rigidly mounted on one side of the frame 1 and pivotally mounted for swinging movement thereon is a hand lever 22, the detent or keeper thereon (not shown) engageable with the teeth of the segment 21 in a manner to secure the hand lever in adjusted position. An eye bolt 23 is mounted in the upper end portion of the arm 18 and slidably disposed through said eye bolt is an actuating rod 24 having its forward end pivotally connected to the lower portion of the hand lever 22 as at 25.

A stop nut 26 is threaded on the rear end portion of the rod 24 for engagement with the eye bolt 23 to limit the rearward swinging movement of the arm 18 independently of said rod 24. The coiled spring 27 encircles the rod 24 and has one end impinged against the eye bolt 23 and its opposite end engages with a cross pin 28 in the rod 24 in a manner to yieldingly urge the eye bolt 23 against the stop nuts 26.

In use, the planter is driven over the rows of seeds and the pairs of disks 10 are lowered into engagement with the ground through the medium of the hand lever 22. Prior to this, said disks 10 are of course, set at the desired angle. As the machine travels over the row of seeds, the pairs of disks 10 throw the dirt inwardly from the opposite sides of the rows in a manner to form a ridge or hill thereover, as will be obvious. Should the disks come into contact with an obstruction such as a rock or a root, the same will be permitted to ride thereover through the medium of the resilient connection between the arms 18 and the rod 24, said arm swinging forwardly in a manner to slide the eye bolts 23 forwardly on the rod 24 against the tension of the coil spring 27.

As soon as the obstruction is passed, the coil spring 27 will immediately return to ground engaging position. It is further pointed out that the coil spring 27 provides means whereby the disks are maintained in yielding engagement with the ground.

It is believed that the many advantages of a planter attached constructed in accordance with this invention will be readily understood, and although the preferred embodiment of the invention is as illustrated and described, it is to be understood that changes in the details of construction may be had which will fall within the scope of the invention as claimed.

Having thus described our invention what we claim as new is:—

1. A planter attachment of the character described comprising a pair of bars mounted on the planter frame and projecting rearwardly therefrom, eyes on the free ends of the bars, a shaft rockably supported on the planter frame, arms fingered on the shaft and extending rearwardly therefrom, a beam suspended from the free end portions of the arms, vertical guide rods on the beam extending slidably through the eyes, pairs of disks mounted on the beam, and means operatively connected with the rockable shaft for actuating said beam in a manner to shift the beam vertically.

2. A planter attachment of the character described comprising a pair of bars mounted on the planter frame and projecting rearwardly therefrom, eyes on the free ends of the bars, a shaft rockably supported on the planter frame, arms fingered on the shaft and extending rearwardly therefrom, a beam suspended from the free end portions of the arms, vertical guide rods on the beam extending slidably through the eyes, pairs of disks mounted on the beam, means operatively connected with the rockable shaft for actuating said beam in a manner to shift the beam vertically comprising an arm on one end of the shaft, an eye bolt fixed on the arm, a hand lever mounted for swinging movement on the planter frame, means for securing the hand lever in adjusted position against swinging movement, a rod pivotally connected to the hand lever for actuation thereby and extending slidably through the eye bolt, a stop member on one end of the rod engageable with the eye bolt in a manner to limit the sliding movement of the rod therethrough in one direction, a coiled spring encircling the rod and operatively engaging with the eye bolt in a manner to yieldingly engage same with the stop member.

3. A planter attachment of the character described comprising a pair of bars mounted on the planter frame and projecting rearwardly therefrom, eyes on the free end of the bars, substantially L-shaped brackets mounted on the bars and having eyes on one end disposed in vertical alinement with the first-named eyes, bearing blocks mounted on the planter frame, a shaft mounted for rocking movement in the bearing blocks, a pair of arms fixed to the shaft and extending rearwardly and upwardly therefrom, links pivotally suspended from the free end portions of the arms, a horizontally disposed transversely extending beam loosely mounted on the lower ends of the links, pairs of coacting disks adjustably mounted on the opposite end portions of the beam, upstanding guide rods on the beam extending slidably through the vertically alined eyes, and means for adjusting the disks vertically and for maintaining the same in yielding engagement with the ground.

4. A planter attachment of the character described comprising a pair of bars mounted on the planter frame and projecting rearwardly therefrom, eyes on the free end of the bars, substantially L-shaped brackets mounted on the bars and having eyes on one end disposed in vertical alinment with the first mentioned eyes, bearing blocks mounted on the planter frame, a shaft mounted for rocking movement in the bearing blocks, a pair of arms fixed to the shaft and extending rearwardly and upwardly therefrom, links pivotally suspended from the free end portions of the arms, a horizontally disposed transversely extending beam loosely mounted on the lower ends of the links, pairs of coacting disks adjustably mounted on the opposite end portions of the beam, upstanding guide rods on the beam extending slidably through the vertically alined eyes, means for adjusting the disks vertically and for maintaining the same in yielding engagement with the ground, said means comprising an upstanding arm on one end of the shaft, a toothed segment fixed on the planter frame, a hand lever pivotally mounted for swinging movement on the segment, a rod pivotally connected to the hand lever, an eye fixed on the free end portion of the second-named arm and projecting laterally therefrom, said rod extending slidably through the eye, and a stop nut threaded on the free end portion of the rod and engageable with one side of the eye and the coil spring mounted on the rod and engageable with the opposite end of the eye in a manner to yieldingly engage same with the stop nut.

In testimony whereof we affix our signatures.

JULIAN M. TAYLOR.
ROBERT H. TAYLOR.